United States Patent [19]

Hobbs et al.

[11] Patent Number: 5,074,810
[45] Date of Patent: Dec. 24, 1991

[54] AUTOMATIC SPEED CONTROL SYSTEM FOR BOATS

[75] Inventors: James V. Hobbs, Bethesda, Md.; Ralph O. Bowman, Big Pine Key, Fla.

[73] Assignee: Lakeland Engineering Corporation, Bethesda, Md.

[21] Appl. No.: 546,394

[22] Filed: Jun. 29, 1990

[51] Int. Cl.⁵ .............................................. B60K 31/00
[52] U.S. Cl. ........................................... 440/2; 440/87
[58] Field of Search ................... 180/170, 177; 440/1, 440/2, 84, 87

[56] References Cited

U.S. PATENT DOCUMENTS

| | | | |
|---|---|---|---|
| 3,590,938 | 7/1971 | Gurol | 180/177 |
| 4,159,753 | 7/1979 | Boche | 180/170 |
| 4,759,731 | 7/1988 | Uchida et al. | 440/87 |
| 4,872,857 | 10/1989 | Newman et al. | 441/1 |

Primary Examiner—Jesús D. Sotelo
Assistant Examiner—Stephen P. Avila

[57] ABSTRACT

An apparatus for accurately maintaining the speed of a motorboat at a value stet by an operator. The speed of the boat is measured, and compared to a desired speed set by the operator, and the speed of the boat engine adjusted to minimize the difference between the desired speed and the actual speed. The device further incorporates features allowing incremental adjustment of the desired speed, storage of several of these speeds for future use, and a safety feature causing the system to behave as though it were of a conventional manual type if the operator makes a gross change to the setting of a manual throttle lever.

5 Claims, 1 Drawing Sheet

AUTOMATIC SPEED CONTROL SYSTEM FOR BOATS

BACKGROUND OF THE INVENTION (1) Field of Art of the Invention

This invention relates to a method and apparatus for automatically maintaining a boat at or very near a speed set by the operator.

(2) Description of the Related Art

Devices for manually adjusting the speed of a boat by moving the throttle valve or other speed regulating device of the boat engine are well known. These devices are not, however, automatic control systems which continuously monitor the boat speed and hold it constant, and therefore these devices allow the speed of the boat to drift under the influence of disturbances from a water skier, or other outside sources such as changing wind and waves. While certain automatic control systems are commonly employed in automobiles and other similar land vehicles, they are not suited for use in boats. Devices which automatically adjust the speed of boat engines for the purpose of synchronization of the speed of two or more engines are well known, but do not function to control the speed of the boat, but rather the relative rotational speed of two or more engines (see, for instance U.S. Pat. Nos. 3,986,363, 4,586,341, and 4,741,165).

SUMMARY OF THE INVENTION

It is the object of this invention to automatically maintain a boat at a speed set by the operator of the boat, independently of influences from a water skier, or other outside sources such as wind and waves which would otherwise cause the speed of the boat to change.

Another object of this invention is to allow several different desired speeds to be stored, and later recalled without the operator having to remember the speeds, and without having to follow the usual procedure of entering a desired speed into the control system.

Another object of this invention is to allow the operator to make small incremental adjustments to the boat speed in order to determine and set the correct speed for a given set of circumstances.

A further object of this invention is to provide an automatic stop feature which will cause this invention to return the boat to a condition as though this invention were not present, in the event that the system detects a boat speed which varies from the desired speed by more than a predetermined amount, such as five miles per hour, such as if the operator makes a gross adjustment to the throttle lever, as when desiring to stop the boat.

DETAILED DESCRIPTION OF THE INVENTION

Figure 1:
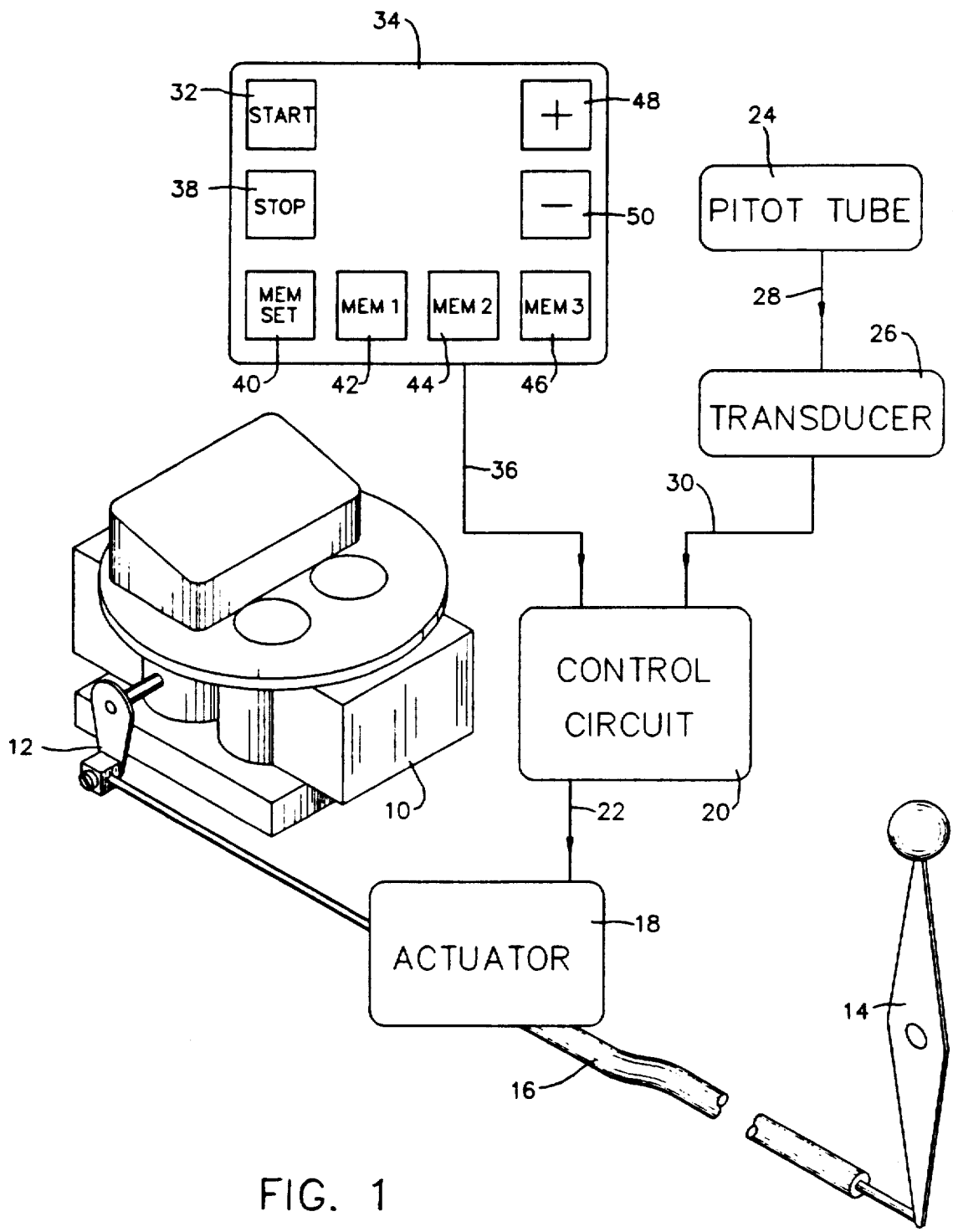
FIG. 1 is a schematic representation of a boat speed control system embodying the present invention.

Referring to FIG. 1, there is a boat engine 10 equipped with an engine throttle lever 12, which is connected to a hand throttle lever 14 by a means such as the well known type called a Bowden cable 16. An actuator 18 causes the engine throttle lever 12 to be displaced in a controlled manner when a source of power such as an electric current is sent to it from the control circuit 20 through actuator cable 22, but otherwise allows normal operation of hand throttle lever 14. This actuator has a limited travel corresponding to a change in position of engine throttle lever 12 which will result in a change of boat speed such as plus or minus five miles per hour. This actuator 18 may be one of many types well known to those having ordinary skill in the art.

In accordance with this invention, the speed of the boat is measured by the Pitot tube 24, which when supported by the structure of the boat and travelling in the water, creates a pressure proportional to the square of the boat speed in a well known manner. The pressure developed at Pitot tube 24 is carried to transducer 26 along a flexible tube 28. The transducer is of a well known type, causing the pressure carried by flexible tube 24 to be converted to an electrical signal proportional to this pressure. This electrical signal is carried to the control circuit 20 by way of transducer cable 30.

The operator adjusts the boat speed by the use of hand throttle lever 14 until the speed of the boat is that desired by the operator. The operator then depresses key 32 of keyboard 34, causing a signal to be sent through keyboard cable 36, in turn causing control circuit 20 to store the value of the speed currently being read from the output of transducer 26. The control circuit 20 then reads subsequent speeds from the output of transducer 26 and compares them to the previously set desired speed. The engine throttle lever 12 is then displaced by actuator 18 so as to cause the boat speed to increase or decrease in order to minimize the difference between the measured speed and the desired speed. This reading of the current speed, comparison to the desired speed, and movement of engine throttle lever 12 takes place continuously, or at a rate of sufficient frequency so as to result in the actual speed of the boat closely matching the desired speed under circumstances which would otherwise result in a varying boat speed. The operation of the system may be halted at any time by pressing the stop key 38, which causes the actuator 18 to return to the center of its travel and remain there, resulting in the linkage from hand throttle lever 14 to engine throttle lever 12 behaving in a conventional manner, as though this invention were not present.

A further feature of this invention allows the operator to store several desired speeds in the control circuit 20 by initiating operation of the system as above, and then pressing the memory set key 40 and one of the memory keys 42, 44, or 46. At a later time, after the system has been stopped by pressing stop key 38, it may be restarted at a memorized speed by first adjusting the boat speed near the memorized speed by moving hand throttle lever 14, and then pressing one of the three memory keys 42, 44, or 46, corresponding to the speed previously stored.

Another feature of this invention is that at any time during the operation of the system, small incremental adjustments may be made to the speed of the boat by pressing one of the incremental adjustment keys 48, or 50. When the increase key 48 is pressed, the control circuit then adjusts the engine throttle lever 12 until the boat speed reaches a new value greater than the original set value by a known amount such as 0.25 miles per hour, and maintains this new speed as long as the operator chooses to allow. Similarly, when the decrease key 50 is pressed, the control circuit adjusts the engine throttle lever 12 until the boat speed reaches a new value less than the original set value by a known amount such as 0.25 miles per hour. This feature allows the operator to make small, precise adjustments to the boat speed in a manner much easier than if the hand throttle lever 14 were used without the system in operation.

Still another feature of this invention automatically causes the system to stop operation as though the stop key 38 were pressed whenever the measured speed of the boat differs from the desired speed by more than a preset amount such as five miles per hour. This feature promotes safety by stopping the automatic operation of the system if the operator manually moves the hand throttle lever 14 an amount great enough to cause the boat to change its speed by the preset value such as five miles per hour. This would occur, for example, when the operator desires to stop the boat due to an the presence of an obstacle in the path of the boat, or another such reason which causes the operator of the boat to desire to greatly change the speed of travel of the boat.

The control circuit 20 generally consists of a microprocessor and related input and output devices. One input device reads operator input from keyboard 34, and another reads electrical signals from transducer 26. An output device drives actuator 18 when directed to do so by a program controlling the operation of the microprocessor. The program controlling the operation of the microprocessor is contained in a programmable device within control circuit 20, and directs the microprocessor to perform the control functions necessary to the operation of this invention, in a manner well known to those having ordinary skill in the art.

We claim:

1. An apparatus for controlling the speed across a body of water of a motorized watercraft pulling a water skier, comprising:
   (a) a Pitot tube and pressure transducer for measuring the speed of said craft relative to the water over which is travels;
   (b) control means for regulating the speed of an engine of said craft whereby a desired speed of said craft relative to the water may be set and maintained under uniform conditions;
   (c) means for comparing said measured speed with said desired speed and for actuating said control means to alter the speed of said engine to correct the speed of said craft relative to said water whenever said measured speed varies from said desired speed, with said actuation taking place quickly and accurately enough to result in said measured speed deviating from said desired speed by less than 0.5 miles per hour.

2. An apparatus according to claim 1 further incorporating an electronic memory in which one or more desired speeds of said watercraft relative to said water may be stored, and may later be recalled in order to easily set and maintain said craft at one of said desired speeds.

3. An apparatus according to claim 1, further allowing an operator to change said desired speed relative to the water, so that small adjustments may be easily made to the speed of said craft relative to said water during operation of said apparatus.

4. An apparatus according to claim 1 which will automatically return itself to a state of manual control means in an event that said apparatus detects that an operator of said watercraft makes a gross change in a setting of a manual speed control device, causing the speed of said watercraft to vary from said desired speed relative to the water by greater then a predetermined amount such as five miles per hour.

5. An apparatus for controlling the speed across a body of water of a motorized watercraft comprising:
   (a) means for measuring the speed of said craft relative to the water over which it travels;
   (b) control means for regulating the speed of an engine of said craft whereby a desired speed of said craft relative to the water may be set and maintained under uniform conditions;
   (c) means for comparing said measured speed with said desired speed and for actuating said control means to alter the speed of said engine to correct the speed of said craft relative to said water whenever said measured speed varies from said desired speed;
   (d) an adjusting feature for changing said desired speed relative to the water, so that specific, calibrated adjustments of 0.5 miles per hour or less may be easily made to said speed of said craft relative to said water during operation of said apparatus.

* * * * *